March 18, 1952  J. F. KENNEY  2,589,703
LEAD STYPHNATE AND PROCESS OF MANUFACTURING SAME
Filed Aug. 17, 1950
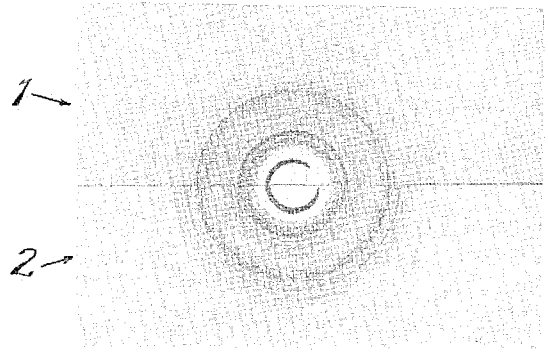
INVENTOR
JOSEPH F. KENNEY
BY
ATTORNEYS Patented Mar. 18, 1952

2,589,703

UNITED STATES PATENT OFFICE 2,589,703

LEAD STYPHNATE AND PROCESS OF MANUFACTURING SAME

Joseph F. Kenney, Bridgeport, Conn., assignor to Remington Arms Company, Inc., Bridgeport, Conn., a corporation of Delaware Application August 17, 1950, Serial No. 179,935

5 Claims. (Cl. 52—2)

This invention relates to normal lead styphnate in a novel crystalline form, to the process of its manufacture, and to its use as an explosive, either by itself or in admixture with other substances commonly used in the preparation of ammunition priming and detonating compositions.

Normal lead styphnate and an early process for its manufacture are described in the patent to von Herz, No. 1,443,328, January 23, 1923. The compound has been extensively used as an explosive, particularly as an ingredient of ammunition priming compositions, and the process by which it is ordinarily made is described in the patent to von Herz, No. 1,999,728, April 30, 1935. Manufacture has always required careful control, to avoid precipitation of the product in elongated needle-like crystals, the fracture of which may cause the detonation of all or a substantial proportion of the batch in process. When dry, the salt is undesirably sensitive to static electricity, and appropriate procedure must be followed in its handling.

The present invention comprises the discovery of a new crystalline form of normal lead styphnate, and a process for producing the salt in this crystalline form. The crystals are stable, rectangular parallelopipeds, and are ordinarily so nearly cubical that for the purpose of distinction from the ordinary salt they will in this specification be called "cubic" crystals. While normal lead styphnate in the form of such cubic crystals is less sensitive to static electricity, it is more sensitive to impact and more uniform in its sensitivity to impact.

The single figure of the drawing shows the X-ray diffraction pattern of the new normal lead styphnate in cubic crystals, and, in juxtaposed relation thereto, the X-ray diffraction pattern of ordinary normal lead styphnate produced by a process which is essentially similar to the one described in the aforementioned patent to von Herz, No. 1,999,728.

The procedure for securing a laboratory quantity of cubic normal lead styphnate is as follows:

About 10 grams of styphnic acid are suspended in 100 cc. of water at a temperature of 70° to 75° C. It should be noted that only a relatively small fraction of the styphnic acid goes into solution, the major portion thereof remaining in suspension. While this suspension is under agitation there is added thereto about 10 cc. of 8-normal potassium hydroxide solution, and the stirring is continued for about 5 minutes. To this admixture there is added a solution of about 20 grams of lead nitrate in about 50 cc. of water, the lead nitrate solution being added at such a rate as to require about 15 minutes time. The precipitate is normal lead styphnate in cubic crystals.

The novel salt has an apparent density of 1.57 grams/cc. and a lead content of 43.4%. Using a 300 mmfd. capacitor, it does not fire at 3,000 volts, whereas ordinary normal lead styphnate gives about 50% fires at 700 volts and 100% fires at about 1,500 volts.

In admixture with 10% ground glass, the novel salt shows, in the usual impact test, an average sensitivity of 4" and a standard deviation of 2", as compared with an average sensitivity of 4.5" and a standard deviation of 2.3" for the ordinary form.

The difference between the molecular structure of cubic normal lead styphnate and that of ordinary normal lead styphnate is strikingly illustrated by their X-ray diffraction patterns, reproduced in the drawing. The lower half of the drawing identified by numeral 2 shows the familiar pattern of the normal salt, while the upper half of the drawing designated as 1 is the pattern of the novel cubic salt. In the latter, the lines which characterize and identify the ordinary salt are absent, and there appears instead a pattern of lines of different placement, width and prominence, definitely indicating a different atomic arrangement.

Ammunition priming compositions containing the novel salt in admixture with the usual oxidizers and fuels show an average sensitivity of 4.42" and a standard deviation of 1.06", as compared with an average sensitivity of 4.94" and a standard deviation of 1.20" for otherwise identical mixtures containing ordinary lead styphnate. Its capacity for igniting other primer ingredients and propellent powders, as measured by the "barrel time" of a projectile, is also superior to that of the ordinary salt. The average projectile barrel time when the novel salt is used is 2.95 milliseconds, against 3.19 milliseconds for the ordinary salt, all other factors being identical.

A typical ammunition priming composition containing the new salt is as follows:

Tetrazene, 1% to 5%, preferably 4%
Cubic normal lead styphnate, 30% to 50%, preferably 38%
Lead nitrate, 20% to 40%, preferably 25%
Lead sulphocyanate, 5% to 15%, preferably 8%
Glass, 15% to 30%, preferably 25%

The ingredients of this composition other than the novel cubic normal lead styphnate may be varied throughout the realm of the teachings of the prior art.

What is claimed is:

1. In the manufacture of the normal lead salt of styphnic acid, the method which comprises the addition to a suspension of about 10 grams of styphnic acid in about 100 cc. of water under agitation and at about 70° to 75° C. of about 10 cc. of about 8-normal potassium hydroxide, the further addition with continued agitation of about 50 cc. of a 40% solution of lead nitrate, and the recovery of the resulting precipitate.

2. The composition of matter normal lead styphnate in crystals which are rectangular parallelopipeds.

3. An ammunition priming composition containing normal lead styphnate in crystals which are rectangular parallelopipeds.

4. An ammunition priming composition containing normal lead styphnate in crystals which are rectangular parallelopipeds, an oxidizer, and a fuel.

5. An ammunition priming composition containing normal lead styphnate in crystals which are rectangular parallelopipeds, an oxidizer, a fuel, and an abrasive.

JOSEPH F. KENNEY.

REFERENCES CITED

The following references are of record in the file of this patent:

UNITED STATES PATENTS

| Number | Name | Date |
| --- | --- | --- |
| 1,443,328 | Herz | Jan. 23, 1923 |
| 1,889,116 | Herz et al. | Nov. 29, 1932 |
| 1,942,274 | Brun | Jan. 2, 1934 |
| 1,999,728 | Herz | Apr. 30, 1935 |
| 2,137,234 | Brun | Nov. 22, 1938 |
| 2,295,104 | Garfield | Sept. 8, 1942 |